United States Patent [19]
Chen

[11] Patent Number: 5,835,363
[45] Date of Patent: Nov. 10, 1998

[54] POWER SUPPLY DEVICE FEATURING SYNCHRONOUS MODE AND ASYNCHRONOUS MODE OPERATION

[75] Inventor: Chi-Jen Chen, Taoyuan, Taiwan

[73] Assignee: Acer Peripherals, Inc., Taiwan

[21] Appl. No.: 970,158

[22] Filed: Nov. 13, 1997

[51] Int. Cl.⁶ .................................................. H02M 1/12

[52] U.S. Cl. ................................................ 363/41; 363/95

[58] Field of Search .................................. 363/21, 41, 95, 363/96, 97, 98, 131

[56] References Cited

U.S. PATENT DOCUMENTS

| | | | |
|---|---|---|---|
| 4,779,183 | 10/1988 | Mutoh et al. | 363/41 |
| 4,802,077 | 1/1989 | Fuji et al. | 363/97 |
| 4,860,186 | 8/1989 | Maekawa et al. | 363/41 |

*Primary Examiner*—Jeffrey L. Sterrett
*Attorney, Agent, or Firm*—Pillsbury Madison & Sutro LLP

[57] ABSTRACT

A power supply device featuring synchronous mode and asynchronous mode operation is disclosed. In the present invention, a simple circuit is used to control the power supply device to switch between synchronous mode (for use in a monitor) and asynchronous mode (for use in a television) as desired.

12 Claims, 4 Drawing Sheets

POWER SUPPLY DEVICE FEATURING SYNCHRONOUS MODE AND ASYNCHRONOUS MODE OPERATION

BACKGROUND OF THE INVENTION

1. Field of the Invention

The present invention relates to a power supply device, and especially relates to a power supply device featuring synchronous mode and asynchronous mode operation, which is controlled by simple signals and suitable for multi-media applications.

2. Description of the Related Art

There are two kinds of power supply devices, synchronous mode and asynchronous mode devices, used in video displays. Power supply device belongs to which kind depending on whether the switching frequency of the power supply device is the same as the horizontal frequency. Generally speaking, in the synchronous mode, the display is not easily subject to external noise, so the display quality is higher.

FIG. 1 depicts a circuit diagram of a power supply device of the prior art. In FIG. 1, a synchronous circuit synchronizes a switching frequency of a power supply device to be the same with the horizontal frequency of the video display. To simplify FIG. 1, a stabilizing feedback circuit is not shown.

Now referring to FIG. 1, a rectifier 12, e.g., a bridge rectifier, rectifies the AC input voltage into a DC voltage; and a filter capacitor 14 reduces the DC voltage ripple. Power supply unit 40, e.g., an IC controller with series number 3842, outputs a first pulse signal p1 to a gate of a control transistor (e.g., NMOS transistor Q) for rapid switching operation (on/off). A transformer 31 at least comprises a primary winding 31, and a secondary winding 32, wherein the primary winding 31 is coupled to a drain of the control transistor Q; and via operations of the control transistor Q, the secondary winding 32 induces a high-frequency pulse voltage which is rectified by an output diode $D_{OUT}$ and filtered by an output capacitor $C_{OUT}$ to serve as an output voltage of the power supply device.

A variable capacitor $C_r$ is connected in series to a variable resistor $R_r$. The connection terminal is coupled to a variable-frequency input terminal of the power control unit 40, e.g., the 4th input pin of IC controller 40. The other terminal of the variable resistor $R_r$ is coupled to a reference-voltage output terminal, e.g., the 8th input pin of IC controller 3842. The frequency of the first pulse signal p1, the switching frequency of the power supply device, is modulated by changing the values of the variable capacitor $C_r$ and the variable resistor $R_r$. A third resistor 66 is connected in series to a differential capacitor 63, a first resistor 62, and a diode 61, wherein the connection terminal between the differential capacitor 63 and the third resistor 66 is coupled to the other terminal of the variable capacitor $C_r$. A second resistor 64 has a terminal coupled to a connection terminal between the differential capacitor 63 and the first resistor 62, and the other terminal coupled to primary ground gnd1 where the other terminal of the third resistor 66 is coupled.

After a second pulse signal p2 is transmitted to the anode of the diode and differentiated by the resistor 62 and the differential capacitor 63, it is input to the 4th input pin of the IC controller 40. Thus, the first pulse signal p1 is synchronous with the second pulse signal p2 (i.e. the switching frequency of the power supply device is the same as the horizontal scanning frequency).

In a power supply device, the transformer is a necessary element. The size of a transformer in a power supply device is related to the switching frequency of the power supply device. The higher the switching frequency, the smaller the size of the transformer is. If the switching frequency is less than 20 KHz, human beings can hear the operating noise from transformers. Furthermore, when the switching frequency is lower, the capacitance and the size of the filter capacitors become larger. So, in fabricating power supply devices, the switching frequency is usually set above 20 KHz to overcome the difficulties discussed above.

To meet a higher solution required by computer monitors, the horizontal scanning-frequency of computer monitors, e.g., 31 KHz, is higher than that of televisions sets, e.g., 15 KHz. Synchronous power supply devices are used for the computer monitors to prevent power supply noise and thus obtain a better display. If power supply device, as shown in FIG. 1, is applied to a television set, then the switching frequency is synchronized with the horizontal scanning frequency as 15 KHz. In such condition, a larger transformer, and larger capacitance and size of capacitors are required. Therefore, asynchronous power supply devices are usually used in television sets, and synchronous power supply devices are used in monitors.

SUMMARY OF THE INVENTION

Therefore, the present invention provides a power supply device featuring both synchronous mode and asynchronous mode operations. The power supply device is controlled by simple signals to operate in either the synchronous mode (for use in a monitor) and in the asynchronous mode (for use in a television). By applying the present invention, fabrication cost is reduced.

DESCRIPTION OF THE DRAWINGS

Other objectives, features, and advantages of the present invention will become apparent from the following detailed description made with reference to an illustrative but non-limiting embodiment. The description is made with reference to the accompanying drawings, in which.

DESCRIPTION OF THE PREFERRED EMBODIMENT

Figure 1:
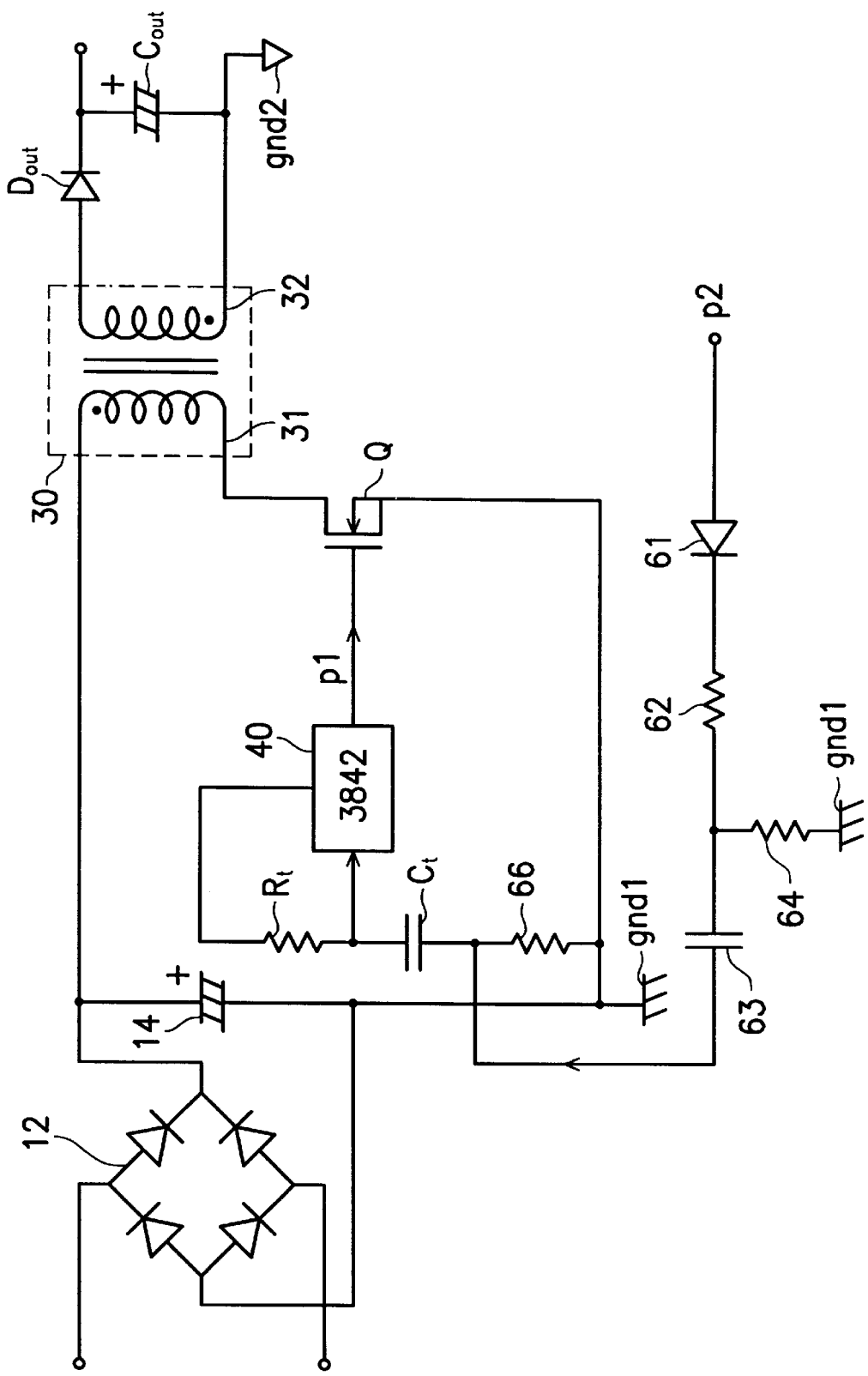
FIG. 1 depicts a circuit diagram of a synchronous power supply device of the prior art.
Figure 2:
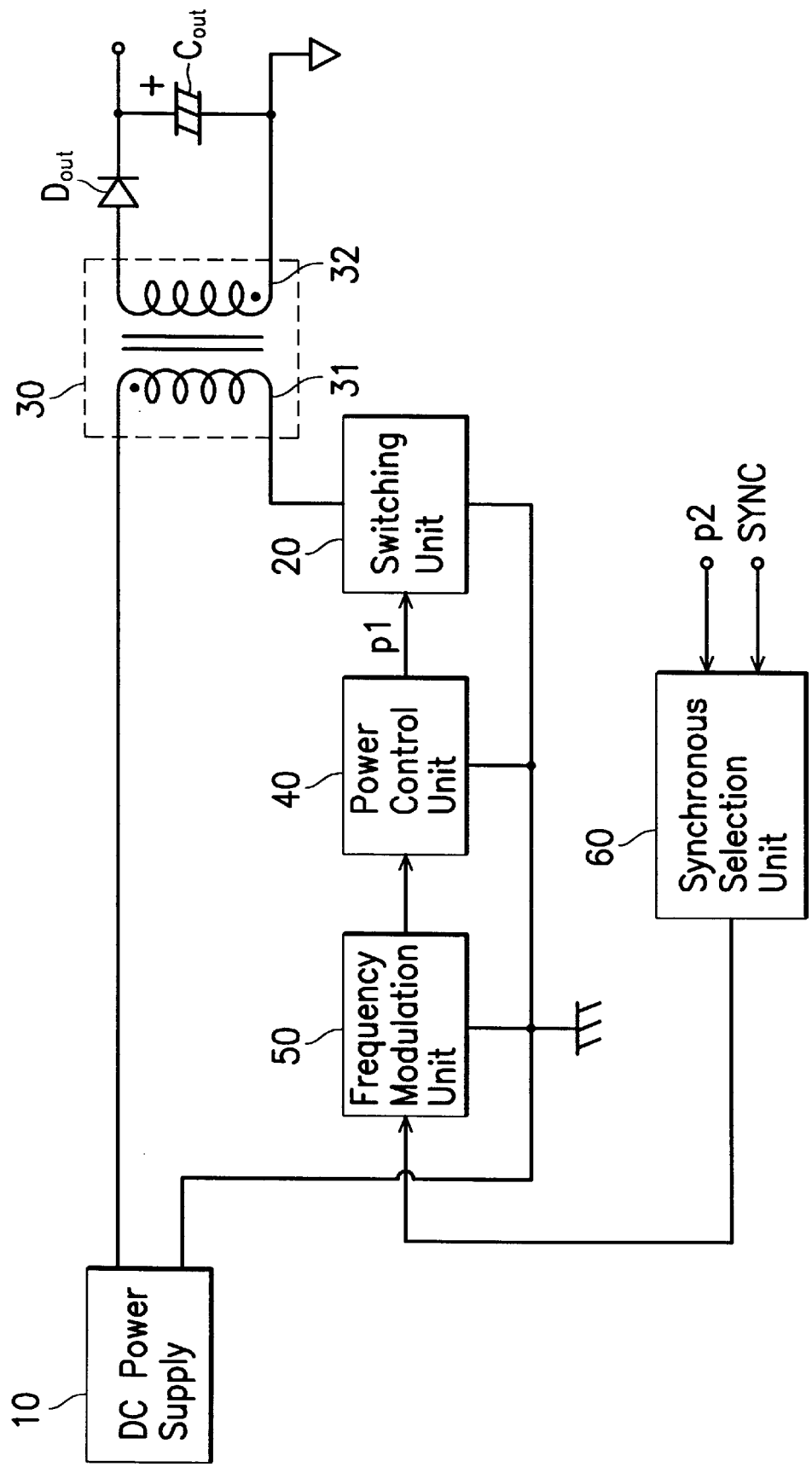
FIG. 2 depicts a circuit diagram of a power supply device with both a synchronous mode and an asynchronous mode in a first embodiment of the present invention.

FIG. 2 depicts a circuit diagram of a power supply device featuring both synchronous mode and asynchronous mode of the present invention. To simply the illustrations, stabilizing feedback circuit is not shown.

Now referring to FIG. 2, a power supply device of the present invention comprises: a DC power supply 10; a power control unit 40, outputting a first pulse signal p1 to a switching unit 20 for a rapid switching between on/off; a transformer 30, at least comprising a primary winding 31, and a secondary winding 32; a frequency modulation unit 50, coupled to a frequency modulation input terminal of the power control unit 40; and a synchronous selection unit 60, receiving a synchronous selection signal SYNC and a second pulse signal p2, having an output terminal coupled to the frequency modulation unit 50.

The primary winding 31 is coupled to the switching unit 20. Via operations of the switching unit 20, the secondary winding 32 induces a high-frequency pulse voltage which is then rectified by an output diode $D_{OUT}$ and filtered by an output capacitor $C_{OUT}$ to serve as an output voltage of the power supply device.

When the synchronous selection signal SYNC is enabled, the second pulse signal p2 is differentiated by the synchronous selection unit 60 and then input to the frequency modulation unit 50 to make the first pulse signal p1 synchronous with the second pulse signal p2. When the synchronous selection signal SYNC is disabled, no differential operation is performed; and the frequency of the first pulse signal p1 is determined by the frequency modulation unit 50.

First embodiment

Figure 3:
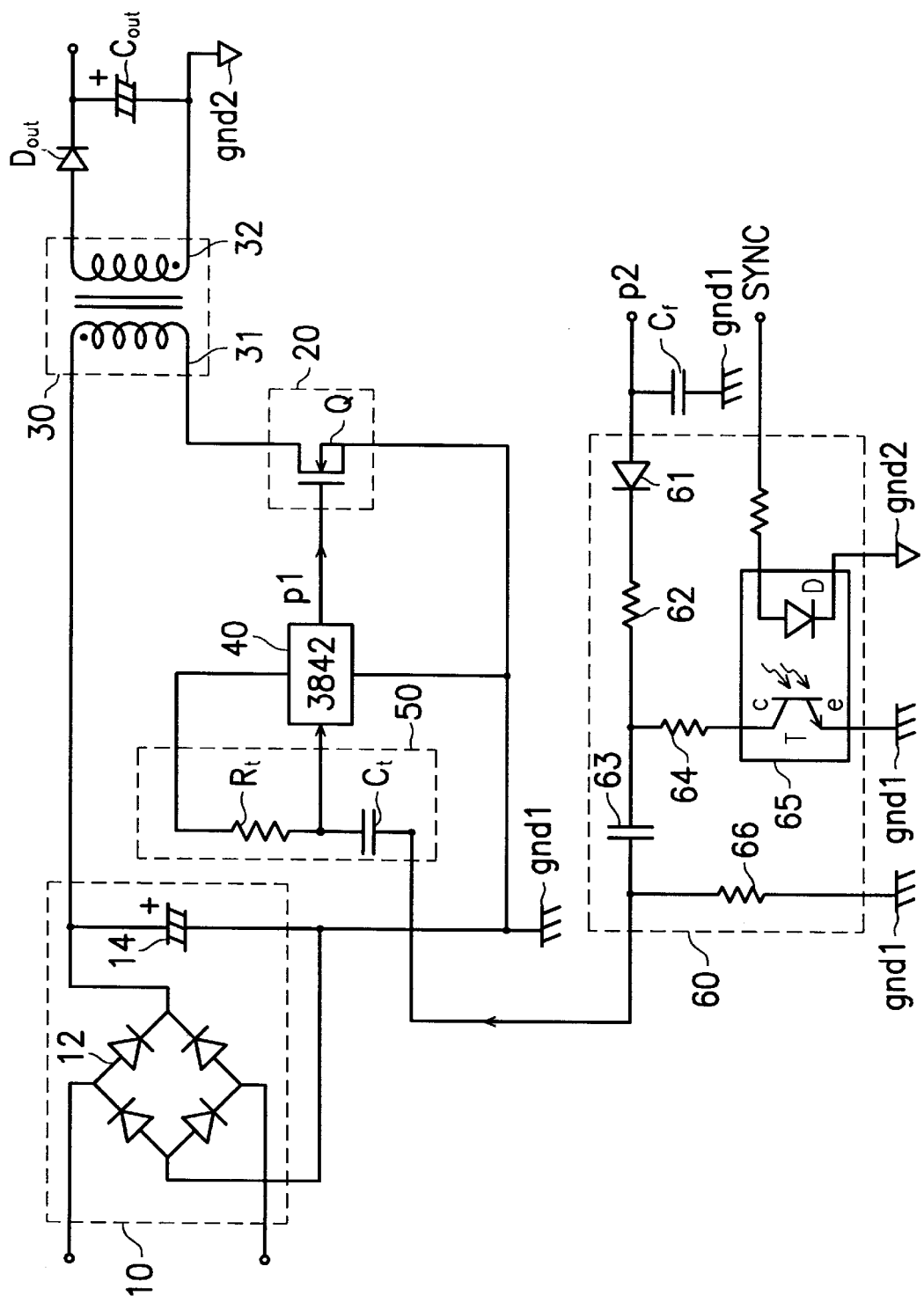
FIG. 3 depicts a circuit diagram of a power supply device with both a synchronous mode and an asynchronous mode in a second embodiment of the present invention.

FIG. 3 depicts a circuit diagram of a power supply device featuring both synchronous mode and asynchronous mode operation of a first embodiment of the present invention. To simply the illustrations, stabilizing feedback circuit is not shown. In this embodiment, an IC controller of series number 3842 is used as a power control unit 40, and an NMOS transistor Q is used as a switching unit 20.

Now ref erring to FIG. 3, a DC power supply 10, which rectifies the AC voltage into DC voltage, comprises a bridge rectifier 12 and a filter capacitor 14. The IC controller 40 outputs a first pulse signal p1 to a gate of the NMOS transistor Q for a rapid switching (on/off).

A transformer 30 comprises at least one primary winding 31, coupled to the switching unit 20, and a secondary winding 32 inducing a high-frequency pulse voltage rectified by an output diode $D_{OUT}$ and filtered by an output capacitor $C_{OUT}$ for acting as an output voltage of the power supply device.

A frequency modulation unit 50 comprises a variable capacitor $C_t$ and a variable resistor $R_t$. The frequency of the first pulse signal p1, i.e., the switching frequency of the power supply device, is determined by values of the capacitor $C_t$ and the variable resistor $R_t$. The connection terminal of the capacitor $C_t$ and the variable resistor $R_t$ is coupled to the 4th pin of the IC controller 40, and the other terminal of the variable resistor $R_t$ is coupled to the 8th pin (reference-voltage output terminal) of the IC controller 40.

A synchronous selection unit 60, coupled to the other terminal of the variable capacitor $C_t$, receives a second pulse signal p2 and a synchronous selection signal sync.

As shown in FIG. 3, the synchronous selection unit 60 comprises a diode 61, a first resistor 62, a differential capacitor 63, a second resistor 64, a selection switch 65, and a third resistor 66. The diode 61 is connected in series to the first resistor 62, the differential capacitor 63, and the third resistor 66. The connection terminal of the differential capacitor 63 and the third resistor 66 is coupled to the variable capacitor $C_t$. The other terminal of the third resistor 66 is coupled to a primary ground gnd1. The second pulse signal p2 is received by the diode 61.

The second resistor 64 has a terminal connected in series to the selection switch 65, and the other terminal coupled to the connection terminal of the first resistor 62 and the differential capacitor 63.

When receiving the synchronous selection signal SYNC, the selection switch 65 is conductive and provides a discharge path for the differential capacitor 63 so that the second pulse signal p2 is differentiated by the differential capacitor 63 and the second resistor 62.

In the first embodiment, the selection switch 65 consists of a photo-coupled separation device or a relay to separate the primary ground gnd1 from a second ground gnd2. In the case of a photo-coupled separation device, when the synchronous selection signal SYNC is logic HIGH, a diode D in the photo-coupled separation device is conductive and thus conduction occurs between a terminal c and a terminal e of a transistor T. Therefore, the second resistor 64 is coupled to the primary ground gnd1 for discharging the differential capacitor 63 to differentiate the second pulse signal p2. After the second pulse signal p2 is transmitted to the 4th input pin of the IC controller 40, it is synchronous with the first pulse p1.

When the synchronous selection signal SYNC is logic LOW, the diode D is turned off and thus conduction occurs between the terminals c and e of the transistor T. At this moment, the second resistor 64 is floating and no discharge path available for the differential capacitor 63. The second pulse signal p2 is not phase-delayed and then the first pulse signal p1 remains asynchronous with p2.

When the power supply device is in the asynchronous mode, the second resistor 64 is floating. The input resistance of the input terminal of the second pulse signal p2 becomes larger, and noise is more easily introduced. In order to prevent interface from noise, a filter capacitor $C_f$ is connected in parallel with the input terminal of the second pulse signal p2 to reduce external noise.

Second embodiment

Figure 4:
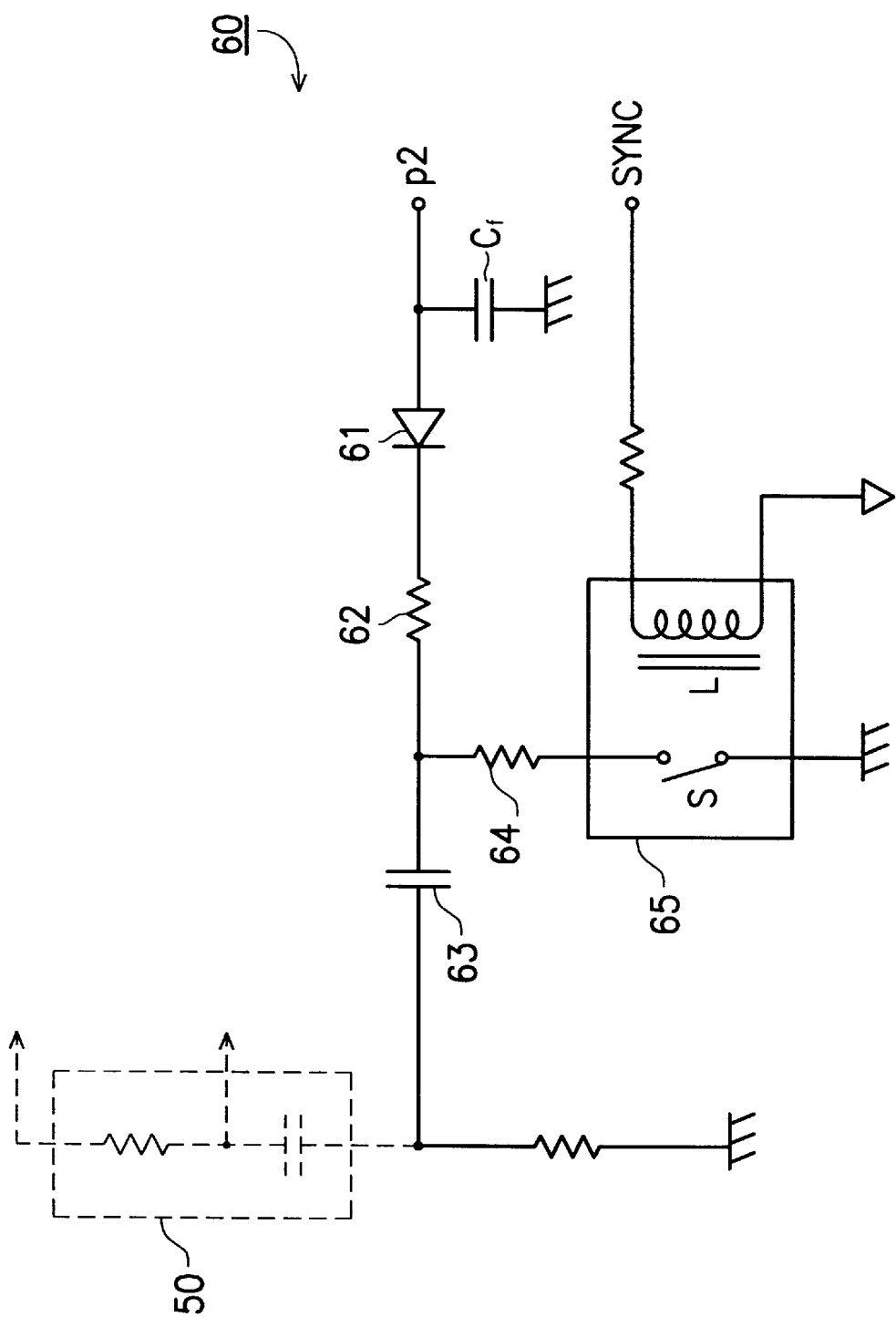
FIG. 4 depicts a circuit diagram of a synchronous selection unit that applies a relay as a selection switch.

Now referring to FIG. 4 which depicts a circuit diagram of the second embodiment of the synchronous selection unit 60 using a relay as the selection switch 65. When the synchronous selection signal SYNC is logic HIGH, the inductor L in the relay is conductive to generate a predetermined magnetic field to force the mechanical switch S closed, so that a differentiation is performed. When the synchronous selection signal SYNC is logic LOW, the inductor L in the relay is not conductive and thus the switch S is open, so that a differentiation is not performed.

From the above embodiments, the power supply device of the present invention enables one set to operate in monitor-mode or television-mode. By applying simple methods and circuitry of the present invention, the fabrication cost is largely reduced, thus raising the competitiveness of the present invention.

Having described the invention in connection with preferred embodiments, modifications will now doubtlessly be apparent to those skilled in this technology. The foregoing description of the preferred embodiments of the invention has been provided for the purposes of illustration and description. It is not intended to be exhaustive or to limit the invention to the precise embodiment disclosed herein. The disclosed embodiment has been chosen and described to best explain the principles of the invention and its practical application, thereby enabling others skilled in this technology to understand the invention, to practice various other embodiments thereof and to make various modifications suited to the particular use contemplated of the present invention. As such, it is intended that the scope of this invention shall not be limited to the disclosed, but rather shall be defined by the following claims and their equivalents.

What is claimed is:

1. A power supply device featuring both synchronous mode and asynchronous mode operation, comprising:

a DC power supply;

a switching unit, receiving a first pulse signal to execute an on/off operation the frequency of which is synchronous with that of said first pulse signal;

a transformer, at least comprising a primary winding and a secondary winding, wherein said DC power supply is applied at said primary winding and said switching unit to produce output voltage at said secondary winding;

a power control unit, outputting said first pulse signal to control said output voltage at said secondary winding;

a frequency modulation unit, coupled to a frequency-modulation terminal of said power control unit; and a synchronous selection unit, receiving a second pulse and a synchronous selection signal, having an output terminal coupled to said frequency modulation unit;

wherein when said synchronous selection signal is enabled, said second pulse signal is differentiated by said synchronous selection unit for outputting to said frequency modulation unit and synchronous with said first pulse signal; and when said synchronous selection signal is disabled, said synchronous selection unit does not differentiate said second pulse signal, and the frequency of said first pulse signal is determined by said frequency modulation unit.

2. The power supply device of claim 1, wherein said synchronous selection unit comprises:

a diode, having an anode receiving said second pulse signal; a first resistor;

a differential capacitor, connected in series to said diode and said first resistor, having a terminal coupled to said frequency modulation unit;

a selection switch; and a second resistor, having a first terminal connected in series to said selection switch, and a second terminal connected to a connection terminal of said differential capacitor and said first resistor;

wherein said selection switch receives said synchronous selection signal to turn on to provide a discharge path for said differential capacitor so that said second pulse signal is differentiated by said differential capacitor and said second resistor.

3. The power supply device of claim 2, wherein said selection switch is a photo-coupled separation device.

4. The power supply device of claim 2, wherein said selection switch is a relay.

5. The power supply device of claim 1, wherein said frequency modulation unit comprises:

a variable capacitor, having a first terminal connected to an output terminal of said synchronous selection unit and a second terminal connected to a frequency-modulation control terminal of said power control unit; and a variable resistor, having a first terminal connected to said second terminal of said variable capacitor, and a second terminal connected to a reference-voltage output terminal of said power control unit.

6. The power supply device of claim 1, wherein said power control unit is a pulse-modulation controller having a frequency-modulation input terminal.

7. The power supply device of claim 6, wherein said pulse-modulation controller is selected from groups of IC series 3842, 3843, and 3844.

8. A power supply device featuring both synchronous mode and asynchronous mode operation, comprising:

a DC power supply;

a switching transistor, receiving a first pulse signal to execute an on/off operation;

a transformer, at least comprising a primary winding and a secondary winding, wherein said DC power supply is applied at said primary winding and said switching unit to produce output voltage at said secondary winding;

a pulse-modulation controller, outputting said first pulse signal to control said output voltage at said secondary winding;

a frequency modulation unit, comprising: a variable capacitor, having a first terminal connected to an output terminal of said synchronous selection unit and a second terminal connected to a frequency-modulation control terminal of said power control unit; and a variable resistor, having a first terminal connected to said second terminal of said variable capacitor, and a second terminal connected to a reference-voltage output terminal of said pulse modulation controller, wherein frequency of said first pulse signal is determined by said variable resistor and said variable capacitor; and a synchronous selection unit, comprising: a diode, having an anode receiving a second pulse signal; a first resistor, connected in series to said diode; a differential capacitor connected in series to said first resistor, a third resistor, connected in series to said differential capacitor, a selection switch; and a second resistor, having a first terminal connected to said selection switch, and a second terminal connected to a connection terminal of said differential capacitor and said first resistor;

wherein said selection switch receives a synchronous selection signal and thereby begins to conduct in order to provide a discharge path for said differential capacitor so that said second pulse signal is differentiated by said differential capacitor and said second resistor; and wherein when said synchronous selection signal is enabled, said second pulse signal is differentiated by said synchronous selection unit for outputting to said frequency modulation unit and synchronous with said first pulse signal; and when said synchronous selection signal is disabled, said synchronous selection unit does not differentiate said second pulse signal, and frequency of said first pulse signal is determined by said frequency modulation unit.

9. The power supply device of claim 8, wherein said selection switch is a photo-coupled separation device.

10. The power supply device of claim 9, wherein said selection switch is a relay.

11. The power supply device of claim 8, wherein said pulse-modulation controller is selected from a group of IC series 3842, 3843, and 3844.

12. The power supply device of claim 8, wherein a capacitor is connected in parallel with an input terminal of said second pulse signal to reduce external noise.

* * * * *